United States Patent
Ziems

(10) Patent No.: US 9,729,379 B2
(45) Date of Patent: Aug. 8, 2017

(54) METHOD AND NETWORK EQUIPMENT FOR MAINTAINING A MEDIA STREAM THROUGH ANOTHER NETWORK EQUIPMENT WHILE SUSPENDING AN ASSOCIATED MEDIA STREAM CONNECTION IN A COMMUNICATION NETWORK

(75) Inventor: Wilfried Ziems, Taufkirchen (DE)

(73) Assignee: Nokia Solutions and Networks Oy, Espoo (FI)

( * ) Notice: Subject to any disclaimer, the term of this patent is extended or adjusted under 35 U.S.C. 154(b) by 716 days.

(21) Appl. No.: 12/671,527

(22) PCT Filed: Jul. 21, 2008

(86) PCT No.: PCT/EP2008/059505
§ 371 (c)(1),
(2), (4) Date: Mar. 1, 2010

(87) PCT Pub. No.: WO2009/019125
PCT Pub. Date: Feb. 12, 2009

(65) Prior Publication Data
US 2011/0191487 A1 Aug. 4, 2011

(30) Foreign Application Priority Data
Aug. 3, 2007 (EP) .................................. 07015305

(51) Int. Cl.
*H04L 29/06* (2006.01)
*H04M 3/428* (2006.01)

(52) U.S. Cl.
CPC .... *H04L 29/06027* (2013.01); *H04L 65/1083* (2013.01); *H04L 65/1096* (2013.01); *H04M 3/428* (2013.01)

(58) Field of Classification Search
USPC ......................................... 709/206, 231, 232
See application file for complete search history.

(56) References Cited

U.S. PATENT DOCUMENTS

| | | | |
|---|---|---|---|
| 6,917,587 B1 * | 7/2005 | Sarkar ................. | H04M 3/2254 370/230 |
| 7,006,618 B1 * | 2/2006 | Shaffer ............... | H04M 1/2535 379/202.01 |

(Continued)

FOREIGN PATENT DOCUMENTS

WO    WO 00/08821    2/2000

OTHER PUBLICATIONS

ETSI ES 283 018 V1.1.1 (Jun. 2006), Telecommunications and Internet converged Services and Protocols for Advanced Networking (TISPAN); Resource and Admission Control: H.248 Profile for controlling Border Gateway Functions (BGF) in the Resource and Admission Control Subsystem (RACS); Protocol specification.

(Continued)

*Primary Examiner* — Backhean Tiv
(74) *Attorney, Agent, or Firm* — Harrington & Smith

(57) ABSTRACT

A method for maintaining a media stream through a first network equipment while suspending the associated media stream connection in a communication network, comprising receiving within a second network equipment a trigger for suspending a media stream, sending a signalling command for maintaining the media stream and blocking the maintained media stream is provided.

19 Claims, 10 Drawing Sheets

(56) References Cited

U.S. PATENT DOCUMENTS

| | | | |
|---|---|---|---|
| 7,123,707 B1* | 10/2006 | Hiri | H04L 29/06027 379/215.01 |
| 7,230,930 B2* | 6/2007 | Ahya | H04W 84/02 370/278 |
| 7,586,857 B2* | 9/2009 | Ejzak | H04M 3/56 370/260 |
| 7,973,859 B2* | 7/2011 | Zeng | H04N 7/147 348/552 |
| 2002/0060989 A1* | 5/2002 | Motobayashi | H04L 12/1818 370/260 |
| 2003/0072556 A1* | 4/2003 | Okujima | G11B 20/10 386/201 |
| 2004/0054724 A1* | 3/2004 | Sudo | H04M 3/56 709/204 |
| 2004/0196867 A1* | 10/2004 | Ejzak | H04M 3/56 370/468 |
| 2005/0119005 A1* | 6/2005 | Segal | H04W 36/14 455/445 |
| 2005/0144247 A1* | 6/2005 | Christensen | H04L 51/04 709/207 |
| 2005/0213518 A1* | 9/2005 | Ahya | H04W 84/02 370/276 |
| 2006/0026318 A1* | 2/2006 | Lee | G06F 3/1438 710/72 |
| 2006/0227728 A1* | 10/2006 | Baumann | H04L 29/06027 370/260 |
| 2006/0233176 A1* | 10/2006 | Stumer | H04M 3/54 370/395.2 |
| 2007/0070976 A1* | 3/2007 | Mussman | H04L 12/6418 370/351 |
| 2007/0217589 A1* | 9/2007 | Martin | H04M 3/56 379/202.01 |
| 2007/0242051 A1* | 10/2007 | Horikiri | H04L 12/1831 345/173 |
| 2007/0263802 A1* | 11/2007 | Allen | 379/93.01 |
| 2008/0032686 A1* | 2/2008 | Xu | H04M 15/00 455/422.1 |
| 2008/0112395 A1* | 5/2008 | Zhu et al. | 370/352 |
| 2008/0119173 A1* | 5/2008 | Nguyen | H04M 3/4285 455/414.1 |
| 2008/0136897 A1* | 6/2008 | Morishima | H04L 12/1822 348/14.08 |
| 2008/0137643 A1* | 6/2008 | Khanchandani | H04M 7/0012 370/352 |
| 2010/0077038 A1* | 3/2010 | Boberg et al. | 709/206 |

OTHER PUBLICATIONS

ETSI TS 183 017 V1.1.1 (Mar. 2006), Telecommunications and Internet Converged Services and Protocols for Advanced Networking (TISPAN); Resource and Admission Control; DIAMETER protocol for session based policy set-up information exchange between the Application Function (AF) and the Service Policy Decision Function (SPDF); Protocol specification.

Handley et al., "SDP: Session Description Protocol", Network Working Group, Request for Comments: 2327, Category: Standards Track, ISI/LBNL, Apr. 1998.

Rosenberg et al., "SIP: Session Initiation Protocol", Network Working Group, Request for Comments: 3261, Obsoletes: 2543, Category: Standards Track, AT&T, Jun. 2002.

3GPP TS 23.228, V7.7.0 (Mar. 2007), $3^{rd}$ Generation Partnership Project; Technical specification Group Services and Aspects; IP Multimedia Subsystem (IMS); Stage 2 (Release 7), 223 pgs.

* cited by examiner

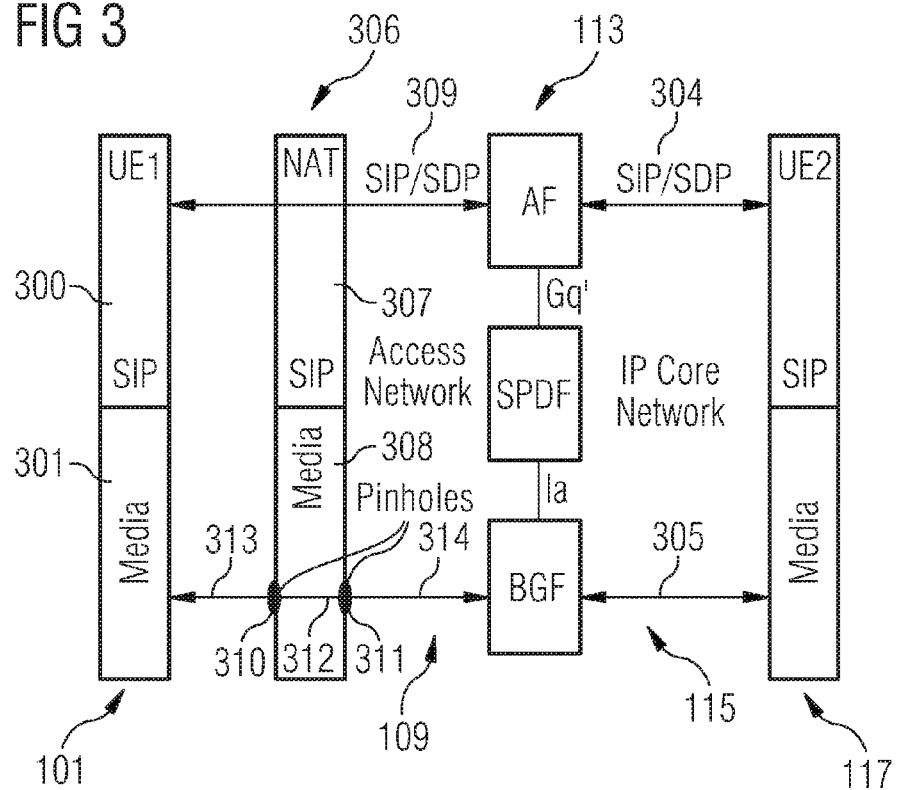
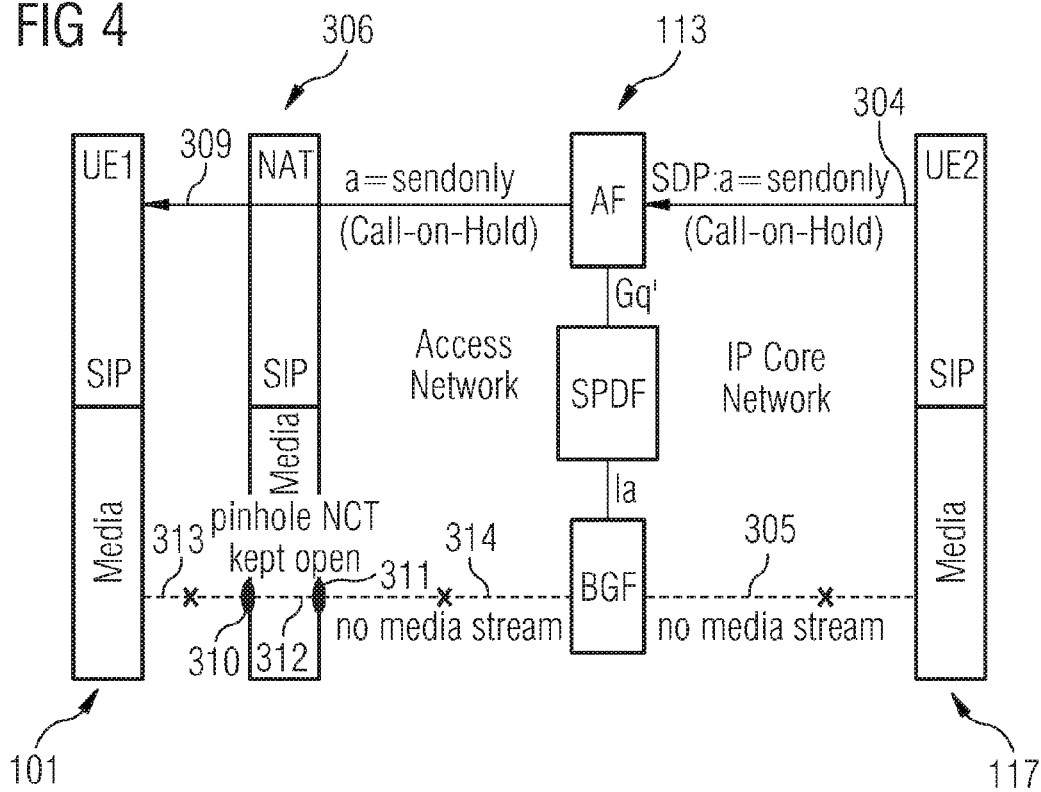

FIG 8  S1

Re-INVITE Client 2 → AF (→ Client 1)

INVITE sip:Client1@pc43.munichnet.com SIP/2.0
From: sip:Client2@gmx.com; ...
To: sip:Client1@munichnet.com; ...

⋮

Content-Type: application/sdp
Content-Length: ...

v=0

⋮ c=IN IP4 180.210.220.230
a=sendonly                    <= "Call-On-Hold"
m=audio 3456 RTP/AVP 8
a=rtpmap: 8 PCMU/8000

FIG 9   S2

Re-INVITE (Client 2 →) AF → Client 1

INVITE sip:Client1@pc43.munichnet.com SIP/2.0
From: sip:Client2@gmx.com; ...
To: sip:Client1@munichnet.com; ...
⋮
Content-Type: application/sdp
Content-Length: ...

v=0
⋮ c=IN IP4 130.115.125.135
a=sendrecv                    <= "normal" send / receive
m=audio 3456 RTP/AVP 8
a=rtpmap: 8 PCMU/8000

FIG 10   S3

200_OK Client 1 → AF (→ Client 2)

SIP/2.0 200 OK
From: sip:Client2@gmx.com; ...
To: sip:Client1@munichnet.com; ...
⋮
Content-Type: application/sdp
Content-Length: ...

v=0
⋮ c=IN IP4 10.11.12.13
t=0 0
a=sendrecv
m=audio 49172 RTP/AVP 8
a=rtpmap: 8 PCMA/8000

AAR AF → SPDF (Gq' interface)

<AA-Request> ::= < Diameter Header: 265, REQ, PXY >
< AVP263: Session-Id >
{ AVP258: Auth-Application-Id }
{ AVP264: Origin-Host }
{ AVP296: Origin-Realm }
{ AVP283: Destination-Realm }
[ AVP517: Media-Component-Description ]
　+- { AVP518: Media-Component-Number = 1 }
　+- [ AVP520: Media Type = audio ]
　+- [ AVP511: Flow-Status = Enabled-Downlink ]
　+- [ AVP519: Media-Sub-Component (=RTP) ]
　+- [ AVP519: Media-Sub-Component (=RTCP) ]
　⋮

AAA SPDF → AF (Gq' interface)

<AA-Answer> ::= < Diameter Header: 265, PXY >
< AVP263: Session-Id >
{ AVP258: Auth-Application-Id }
{ AVP264: Origin-Host }
{ AVP296: Origin-Realm }
[ AVP268: Result Code ]
⋮

200_OK (Client 1 →) AF → Client 2

SIP/2.0 200 OK
From: sip:Client2@gmx.com; ...
To: sip:Client1@munichnet.com; ...
⋮

Content-Type: application/sdp
Content-Length: ...

v=0
⋮ c=IN IP4 180.115.125.135
t=0 0
a=recvonly
m=audio 49172 RTP/AVP 8
a=rtpmap: 8 PCMA/8000

ACK Client 2 → AF → Client 1

ACK sip:Client1@pc43.munichnet.com SIP/2.0
From: sip:Client2@gmx.com; ...
To: sip:Client1@munichnet.com; ...
⋮

Content-Length: 0

Re-INVITE Client 2 → AF (→ Client 1)

INVITE sip:Client1@pc43.munichnet.com SIP/2.0
From: sip:Client2@gmx.com; ...
To: sip:Client1@munichnet.com; ...
⋮
Content-Type: application/sdp
Content-Length: ...

v=0
⋮ c=IN IP4 180.210.220.230
a=sendrecv                    <= "Call-Retrieve"
m=audio 3456 RTP/AVP 8
a=rtpmap: 8 PCMU/8000

Re-INVITE (Client 2 →) AF → Client 1

INVITE sip:Client1@pc43.munichnet.com SIP/2.0
From: sip:Client2@gmx.com; ...
To: sip:Client1@munichnet.com; ...
⋮
Content-Type: application/sdp
Content-Length: ...

v=0
⋮ c=IN IP4 130.115.125.135
a=sendrecv                    <= "normal" send / receive
m=audio 3456 RTP/AVP 8
a=rtpmap: 8 PCMU/8000

FIG 17  S10

200_OK Client 1 → AF (→ Client 2)

SIP/2.0 200 OK
From: sip:Client2@gmx.com; ...
To: sip:Client1@munichnet.com; ...

⋮

Content-Type: application/sdp
Content-Length: ...

v=0

⋮ c=IN IP4 10.11.12.13
t=0 0
a=sendrecv
m=audio 49172 RTP/AVP 8
a=rtpmap: 8 PCMA/8000

FIG 18  S11

AAR AF → SPDF (Gq' interface)

```
<AA-Request> ::= < Diameter Header: 265, REQ, PXY >
                 < AVP263: Session-Id >
                   { AVP258: Auth-Application-Id }
                   { AVP264: Origin-Host }
                   { AVP296: Origin-Realm }
                   { AVP283: Destination-Realm }
                   [ AVP517: Media-Component-Description ]
                     +- { AVP518: Media-Component-Number = 1 }
                     +- [ AVP520: Media Type = audio ]
                     +- [ AVP511: Flow-Status = Enabled ]
                     +- [ AVP519: Media-Sub-Component (=RTP) ]
                     +- [ AVP519: Media-Sub-Component (=RTCP) ]
                     ⋮
                   ⋮
```

FIG 19  S12

AAA SPDF-> AF (Gq' interface)

```
<AA-Answer> ::= < Diameter Header: 265, PXY >
                < AVP263: Session-Id >
                { AVP258: Auth-Application-Id }
                { AVP264: Origin-Host }
                { AVP296: Origin-Realm }
                [ AVP268: Result-Code ]
                  ⋮
```

FIG 20  S13

200_OK (Client 1→) AF → Client 2

SIP/2.0 200 OK
From: sip:Client2@gmx.com; ...
To: sip:Client1@munichnet.com;...
⋮
Content-Type: application/sdp
Content-Length: ...

v=0
⋮
c=IN IP4 180.115.125.135
t=0 0
a=sendrecv
m=audio 49172 RTP/AVP 8
a=rtpmap: 8 PCMA/8000

FIG 21  S14

ACK Client 2 → AF → Client 1

ACK sip:Client1@pc43.munichnet.com SIP/2.0
From: sip:Client2@gmx.com; ...
To: sip:Client1@munichnet.com; ...
⋮
Content-Length: 0

METHOD AND NETWORK EQUIPMENT FOR MAINTAINING A MEDIA STREAM THROUGH ANOTHER NETWORK EQUIPMENT WHILE SUSPENDING AN ASSOCIATED MEDIA STREAM CONNECTION IN A COMMUNICATION NETWORK

FIELD OF THE INVENTION

The present invention relates to the field of communication networks. In particular the present invention relates to a method for maintaining a media stream through a network equipment while suspending an associated media stream connection in a communication network, to a network equipment for maintaining a media stream through another network equipment while suspending an associated media stream connection in a communication network, to a computer-readable medium, in which a computer program for maintaining a media stream through a network equipment while suspending an associated media stream connection in a communication network is stored, and to a program element for maintaining a media stream through a network equipment while suspending an associated media stream connection in a communication network.

ART BACKGROUND

A SIP network is a communication network using the session initiation protocol (SIP). In a session initiation protocol (SIP) network a SIP-client, which is connected to an access network e.g. a fixed access network, may be connected behind a network address translation (NAT) server. A NAT-server may be a digital subscriber line (DSL) modem, which is part of an access network. The DSL modem is connected to a core network via a digital subscriber line access multiplexer (DSLAM).

Between the access network and the core network a session border controller may be located in order to control the connections, which have access to the core network. In particular the core network is an internet protocol (IP) network.

A session border controller may be known from the ETSI-TISPAN (European Telecommunications Standards Institute—Telecoms & Internet converged Services & Protocols for Advanced Networks) specification ETSI-TS 183 017. The command format for diameter based commands used by the Gq' interface is described in ETSI specification ETSI-TS 183 017.

The structure of the SIP messages (e.g. Re-INVITE, 200_OK, ACK) is described in IETF's (Internet Engineering Task Force) RFC 3261, and the structure of a SDP body is described in RFC 2327. The session description protocol (SDP) is used for the description of multimedia sessions over IP-based networks. SIP may rely on SDP. SDP attributes are known from IETF's RFC 2327.

The message format for a H.248 message or a H248 message used by the Ia interface is described in ETSI specification ETSI-ES 283 018.

An end device, a user equipment or a user terminal using the SIP protocol is called a SIP-client. A plurality of SIP-clients may be connected by SIP/SDP-sessions or SIP/SDP-connections. Media streams may be exchanged via a SIP/SDP-session. After establishing a SIP/SDP-session between two or a plurality of SIP-clients the SIP/SDP-session may be routed via a NAT-server. The NAT-server monitors media streams which are exchanged between the connected SIP-clients.

The NAT-server determines when a media stream is idle for a certain period of time, which means that for that period of time no user data have been exchanged or transmitted via the media stream or the media stream connection. When such an idle state is detected, the NAT-server closes the relevant media stream by closing pinholes within the NAT-server, which are associated with corresponding media stream.

In other words, when the NAT-server determines an inactive media stream, the NAT-server closes the connection using the functionality of closing the pinholes. As a consequence, the whole connection is shut down. Once a NAT-server has closed a media stream between the SIP-clients, no further exchange of media data or media streams between the SIP-clients will be possible. When the media streams between the SIP-clients have been shut down by the NAT-server, no possibility exists to bring the connection up again besides establishing a new connection.

Such a shutdown of a media stream connection may also happen when a SIP-client has suspended a connection for a certain time. A suspension of a connection may be required when a SIP-client wants to put a connection on hold or put a call on hold. The function of putting a connection on hold quite often is called a call-on-hold function. There may be a need for preventing a shutdown by the NAT-server during a call-on-hold function.

SUMMARY OF THE INVENTION

This need may be met by the subject-matter according to the independent claims. Thus, a method for maintaining a media stream through a network equipment while suspending an associated media stream connection in a communication network, a network equipment for maintaining a media stream through another network equipment while suspending an associated media stream connection in a communication network, a computer-readable medium in which a computer program for maintaining a media stream through a network equipment while suspending an associated media stream connection in a communication network is stored, and a program element for maintaining a media stream through a network equipment while suspending an associated media stream connection in a communication network is provided.

According to an aspect of the invention a method for maintaining a media stream through a first network equipment while suspending an associated media stream connection in a communication network comprises receiving within a second network equipment a trigger for suspending a media stream connection, sending a signalling command for maintaining the media stream connection and blocking the maintained media stream connection. The trigger is detected within the network equipment. In other words, a method for suspending a media stream connection in a communication network is provided.

According to a further aspect of the invention a network equipment for maintaining a media stream through another network equipment while suspending an associated media stream connection is provided. E.g. a session border controller is a network equipment for maintaining a media stream through another network equipment like a NAT-server. In other words, a network equipment for suspending a media stream connection in a communication network is provided. However, the other network equipment may be integrated in the network equipment. The network equipment may combine the functionality of a session border router and a NAT-server in one single device.

The network equipment comprises a receiving unit, a signalling unit and a blocking unit. The receiving unit is adapted for receiving a trigger for suspending the media stream connection. The signalling unit is adapted for sending a signalling command for maintaining the media stream connection to one of the clients when the trigger for suspending is received and detected, and the blocking unit is adapted to block the maintained media stream connection, such that the blocking unit is able to block the maintained media stream connection. Therefore, the blocking unit receives from the signalling unit a command or a message for blocking the media stream connection.

Further, according to yet another aspect of the invention a computer-readable medium is provided, in which a computer program for maintaining a media stream through a network equipment while suspending an associated media stream connection in a communication network is stored, which program, when being executed by a processor is adapted to carry out receiving within a network equipment a trigger for suspending the media stream connection, sending a signalling command for maintaining the media stream connection and blocking the maintained media stream connection.

A computer-readable medium may be a CD-ROM, a DVD, a floppy disk, a hard disk, a USB memory (universal serial bus), etc.

According to another aspect of the present invention a program element for maintaining a media stream through a network equipment while suspending an associated media stream connection in a communication network is provided, which program element when being executed by a processor is adapted to carry out, receiving within a network equipment a trigger for suspending a media stream connection, sending a signalling command for maintaining the media stream connection and blocking the maintained media stream connection.

Receiving a trigger in the context of this application may also mean that a trigger is received and the trigger is detected as being a trigger for maintaining the media stream connection and as being a trigger for blocking the maintained media stream connection.

Receiving within a network equipment a trigger for suspending a media stream may allow to detect when a suspension of a media stream in a communication network may be required. Such a trigger may be an external command sent to the network equipment. Such a command may be sent by a remote user or a local user. The command may signal that the remote user or the local user plans to suspend the media stream connection or the user plans to put the media stream on hold.

A function for putting the media stream on hold may be also called a call-on-hold function or call-on-hold functionality. Such a call-on-hold functionality may be a service in a telephone network or in plain old telephone service (POTS) network. However, a call-on-hold functionality may also be used in any communication network, e.g. a data network, a mobile network or a communication network. A call-on-hold functionality may be used for temporarily suspend a media stream connection or a media stream. A call-on-hold function may prevent that for a period of time user data are sent to the originator of the call-on-hold trigger.

The call-on-hold functionality may allow the originator of the call-on-hold function to disconnect an existing connection during the originator sets-up a call to another user or during the originator answers a call from the other user. The call-on-hold functionality may allow the originator to request information from another party while the connection, which was established before, is still maintained. Thus, a connection may not have to be shut down during a short request to the other party.

The call-on-hold functionality may also be used to initiate a telephone conference or media stream conference.

In this text the term user may be used to describe a natural person who is using a telecommunication end device, the term user may be also used for describing the end device, the terminal, the user equipment or any connection end point from a connection.

A connection may be defined as a user connection which may be a switched connection, a virtual connection, a telephone connection, a media stream connection or a media stream. A connection may also belong to a signalling network and in such a case a connection may be called a signalling connection. A signalling connection may be used for exchanging or transporting signalling information or signalling data.

A media stream or a payload connection may be used to transport user information in a digital format such as voice traffic, data traffic, music, Internet traffic, video traffic, streaming data, etc. The connection may be a peer to peer or a point to multi-point connection.

Sending a signalling command for maintaining the media stream may signal to a local user or local user equipment to keep a media stream connection up and running or to continue sending user data. In order to prevent the expiration of a timer of a local user equipment, the user may also send predetermined keep alive messages over an established connection. The timer may be used to shutdown a media connection by blocking the media connection.

The trigger may show that a remote user wants to suspend a media stream only for a predetermined period of time. Thus, maintaining an existing connection may allow simulating an active connection via a NAT-server. Blocking at the same time in a network equipment the media stream data, which are transported via the connection, may prevent the media stream data reaching a core network. In other words, for reasons of preventing the closing of a connection through a NAT-server, the connection may be maintained and this maintained connection and in particular the data transported by this connection may be blocked.

A communication network may be divided in an access network and a core network, in particular an IP access network and an IP core network. An access network may be operated by an access network operator and a core network may be operated by a core network operator. However, a full-service provider may operate the access network as well as the core network.

An access network may be a network which is used to concentrate the traffic of a plurality of users on the way into the core network. An access network may be a cable network, an xDSL (digital subscriber line) network or a single line connected to a service provider network equipment or to a network operator.

One of a plurality of criteria to differentiate between an access network and a core network may be the bandwidth transported by each line of the corresponding network. An access network may use a smaller bandwidth per line as a core network. In an access network may direct access lines be used allowing to associate the lines to single users, whereas in a core network, network lines with high bandwidth may be employed transporting a plurality of virtual connections.

Part of an access network may be a NAT-server, which may be used to connect user equipment to an access network or to a core network. Such a NAT-server may be connected to a session border router or to a session border controller.

A plurality of users or a plurality of user equipments may be connected to such a session border router and the session border router or session border controller may control each single connection of the plurality of user.

A connection from one user to another user may comprise a control connection and a media connection, media stream or media stream connection. The control connection may also be called a signalling connection. The control connection and the media stream connection may be associated. The control connection may be used to exchange signalling information with the network, with another user, with another party or with another peer and the media connection may be used to exchange user data or media streams with the other peer.

A trigger may be initiated by a network equipment, by a remote user or by a local user. E.g. a network equipment may suspend a call in order to reduce the network load.

Sending a signalling command, which signals maintaining a media stream may allow to initiate a simulation of a media connection even if the initiator of a suspend command or a call-on-hold command may expect that the media connection is suspended or interrupted, i.e. the connection may be up. However, the connection may not transport or forward any data from a certain position of the connection.

Continuing sending media streams may allow to prevent that a NAT-server closes a pinhole, which relates to the corresponding media stream.

The term 'pinhole' may denote a pair of upstream and downstream gates for bidirectional media transport via a network equipment, e.g. a NAT-server. A gate may operate on an unidirectional flow of media data packets or media streams, i.e. in either the upstream or downstream direction. When a gate is open, the packets in the flow may be accepted and transmitted. When a gate is closed, all of the packets in the flow may be dropped at a certain position of the connection.

Thus, a NAT-server's pinhole may be described by a 4-tuple comprising the NAT-server's IP address and the port address of the NAT-server's user equipment side and the NAT-server's access network side, and further comprising both termination adresses of the media streams, i.e the user equipment's address and e.g. the access network's termination address at the border to the IP core network.

The user equipment side may be the side of a network equipment, the local user is connected to. The access network side may be the side of a network equipment, the core network or the remote user is connected to.

Using the above-described method may allow in the case of call-on-hold or of a believed suspended connection to keep the pinholes of a NAT-server open. The open pinholes in the NAT-server may allow passing of media streams through the NAT-server to the session border controller. Since the media streams may still be sent just for keeping open the pinholes this traffic may not be needed on the other side of the session border controller, which side is connected to the core network.

Thus, the traffic flowing via the connection may be blocked within the session border controller or within the network equipment. The media streams which keep the NAT-sever open may origin from a user behind the NAT-server. A user who is behind the NAT-server in this context may be a user, SIP-user or SIP-client who is connected via the NAT-server to the session border controller.

According to another aspect of the present invention, the second network equipment is adapted to block the maintained media stream.

Blocking the media stream by the second network equipment may prevent an undesired media stream reaching a predefined area in the network, e.g. the initiator of the trigger and the core network. Thus, network resources may be saved.

According to yet another aspect of the present invention, the trigger is a signalling command for suspending the media stream.

If the trigger is a signalling command, a receiving unit, which uses a standard protocol, such as SIP/SDP, may detect the trigger.

The term SIP/SDP may mean that the SIP protocol is used to transport SDP messages or SDP commands. Other possible transport protocols or control signalling protocols may be media gateway control protocol (MGCP) i.e MGCP/SDP or H.248 i.e. H.248/SDP.

SIP/SDP may also mean the a SIP message, a SDP message or a SIP/SDP message is transferred.

Detecting a signalling command for suspending the media stream may allow the second network equipment to react on a command sent by a user and thus, may allow the user to control the media session. A command used in a standard protocol may be used in order to initiate a suspend function within the second network equipment.

According to another aspect of the present invention, the trigger and/or the signalling command for maintaining the media stream is a SIP/SDP-request or SIP/SDP message.

Thus, the second network equipment may be adapted to be operable in a SIP-network. The network equipment may be simply constructed since only SIP/SDP-messages have to be detected and monitored. The network equipment may monitor a network connection, a plurality of network connections or a plurality of sessions.

According to a further aspect of the present invention, the trigger origins from a first user.

A user, a first user, remote user or local user may initiate suspending a connection. The network equipment may detect such an initiation of suspending a connection or putting a connection on hold. Thus, the network equipment may react to the trigger from the first user or remote user.

According to a further aspect of the present invention, the signalling command for maintaining the media stream is sent to a second user.

Such a second user may be a local user, which can interpret the signalling command for maintaining the media stream. If the second user maintains the media stream although the first user may have sent a suspend command, the pinholes of a NAT-server may be kept open.

The second user may be connected via the NAT-server to a session border controller and thus, exchanging signalling information with the session border controller. In other words, a suspend command which is triggered from the first user may be converted within the second network equipment or the session border controller into a signalling command for maintaining a media stream. For detecting the trigger, the network equipment may filter the signalling connection between the local user and the remote user.

Thus, the second user, receiving the command for maintaining the connection, may receive a different signal compared with the signal the first user intended to send to the second user. The conversion into such an unexpected command may be provided by a second network equipment or session border controller, which may be connected between the first user and the second user.

According to yet another aspect of the present invention the second network equipment is at least one network equipment selected of the group of network equipments consisting of a router, an access router, a session border controller, a session border router, a border gateway router, a NAT-server, a firewall, a cable modem head end and a DSLAM.

A second network equipment may also combine a plurality of functionalities within one single network equipment or within one single housing. For example, the session border controller and the NAT-server may be combined within a physical network equipment. Therefore, a plurality of combinations may be possible for different network equipment or functionalities of different network equipment.

A functionality of a NAT-server may be translating network addresses of different networks, and a session border controller may terminate access connections and may route traffic from an access network into a core network.

According to a further aspect of the present invention, the trigger is received by an application function (AF).

Such an application function may be part of a session border controller or may be part of a second network equipment. An application function may be a functional element offering applications that request and use Internet protocol (IP) bearer resources. The application function (AF) may use the Gq' interface according to the ETSI-TS 183 017 standard to exchange session and media-related information with a service-based policy decision function (SPDF). The AF may be able to receive and monitor signalling information exchanged between the remote user and the local user.

According to yet another aspect of the present invention, the maintained media stream may be blocked by a border gateway function (BGF).

A border gateway function may be used to control media streams. Blocking media streams by a BGF may mean to terminate a media stream and to discard or delete received packages, messages, data or media streams from a user. Discarding such received information may allow to receive information on one side of the second network equipment, however not to send an information to the other side of the network equipment.

Thus, a connection or a media stream may be terminated on the network equipment. Therefore, blocking the maintained media stream may allow simulating a still existing media stream between a local user and a network equipment via a NAT-server while simulating for the remote user a suspended connection.

According to yet another aspect of the present invention, the application function (AF) and the border gateway function (BGF) communicate via a service policy decision function (SPDF).

The SPDF may be a functional element that coordinates the resource reservation requests received from the AF. The SPDF may make policy decisions using policy rules and may forward the session and media related information obtained from the AF to an A-RACF (access RACF, access resource and administration control function) for admission control purposes. Additionally, based on information received on the Gq' interface and on configuration data, the SPDF may request the instantiation of a border gateway function (BGF) via an Ia interface.

According to a further aspect of the present invention, a central controller coordinates sending a signalling command for maintaining the media stream and coordinates blocking of the maintained media stream.

A central controller or processor may allow to simultaneously block a maintained media stream at the moment when a signalling command for maintaining the media stream is sent. A firmware or software may control the central controller and thus allowing reconfiguring the second network equipment. The firmware or software may make the central controller to operate according to the above-described method.

In particular the central controller may be used if AF, SDPF and BGF are co-located in the same physical second network equipment or in the same physical element.

According to yet another aspect of the present invention, the trigger is a SIP/SDP-message indicating 'call-on-hold'.

Detecting a SIP/SDP-message indicating 'call-on-hold' may allow the communication equipment to be used in a SIP environment or in a SIP network. In particular, the indication may be made by using a SDP attribute line, e.g. the 'a'-attribute.

According to a further aspect of the present invention the signalling command or signalling message for maintaining the media stream is a SIP/SDP 'send/receive' command.

According to another aspect of the present invention, the signalling command for maintaining the media stream is a SIP/SDP-message indicating 'normal send and receive'.

'Normal send and receive' may mean according to a standard and may be indicated by an a-attribute line set to 'a=send/receive'.

Above, exemplary embodiments of the present invention as referenced to a method for maintaining a media stream through a first network equipment while suspending an associated media stream in a communication network have been described. It has to be pointed out that of course any combination of features relating to different subject-matters is also possible.

According to another aspect of the present invention, the blocking unit is adapted to block the media within the network equipment.

Blocking the media stream within the network equipment may allow terminating a media connection within the network equipment or with a functionality of the network equipment.

According to yet another aspect of the present invention, the trigger for the blocking unit is a signalling command for suspending the media stream.

According to another aspect of the present invention, the trigger and/or the signalling command for maintaining the media stream is a SIP/SDP-message. E.g. a SIP/SDP-message indicating 'normal send and receive'.

Thus, a SIP-user or SIP-user equipment, which may be a user equipment using the SIP/SDP protocol may be controlled by the network equipment.

According to another aspect of the present invention, the receiving unit is adapted for receiving the trigger, which origins from a first user.

Receiving the trigger which origins from a first user may allow the network equipment to filter such a trigger or trigger command out of a signalling connection and to detect when the first user may initiate a suspension of the media connection or the media session. Thus, this functionality may allow the network equipment to quickly react on such a trigger initiated by the first user.

According to another aspect of the present invention, the signalling unit is adapted for sending the signalling command for maintaining the media stream to a second user.

A signalling unit, which is adapted for sending the signalling command for maintaining the media stream may allow to send a command, which differs from the command intended to send by the originating user. Thus, even if the network equipment may receive a suspend command, the signalling unit may send a maintain command.

According to another aspect of the present invention, the network equipment is at least one selected of the group of network equipments consisting of a router, an access router, a session border controller, a border gateway router, a NAT-server, a firewall, a cable modem head end and a DSLAM.

According to another aspect of the present invention, the network equipment comprises a receiving unit and the receiving unit further comprises an application function (AF).

The application function is adapted for receiving the trigger. The application function may detect a SIP/SDP control signal, for example a SIP/SDP Re-INVITE request indicating 'call-on-hold'.

According to yet another aspect of the present invention, the blocking unit comprises a border gateway function (BGF), wherein the border gateway function is adapted to block the maintained media stream.

Such a border gateway function may prevent traffic of a connection to reach a core network, wherein the connection may be maintained in order to prevent a shutdown of a NAT-server, in particular a shutdown of pinholes of a NAT-server. Thus, the traffic load may be reduced in the core network and resources within the core network may be saved.

According to another aspect of the present invention, the network equipment or network device further comprises a service policy decision function, wherein the service policy decision function is connected to the application function and to the border gateway function.

The service policy decision function (SPDF) is for example dedicated or adapted for controlling a communication between the application function and the border gateway function. The SPDF may allow to convert signals according to the Gq' standard into signals according to the Ia standard.

According to yet another aspect of the present invention, the network equipment further comprises a central controller.

A central processor may be used in order to coordinate the AF, SPDF and BGF in the case if AF, SPDF and BGF are co-located within the same physical element.

Such a central controller may be adapted for coordinating sending the signalling command for maintaining the media stream and simultaneously blocking the maintained media stream.

Thus, a central controller or processor, which may be controlled by executing a firmware or software, may allow to react quickly to a received trigger or to a SIP/SDP suspend command.

According to another aspect of the present invention, the trigger is a SIP/SDP-command indicating 'Call-on-Hold'. In particular, the indication may be made by using a SDP attribute line, e.g. the 'a'-attribute.

According to a further aspect of the present invention the signalling command or signalling message for maintaining the media stream is a SIP/SDP 'send/receive' command.

According to yet another aspect of the present invention, the signalling command for maintaining the media stream sent by the network equipment is a SIP/SDP-command indicating 'normal send and receive'. 'Normal send and receive' may mean according to a standard and may be indicated by an 'a'-attribute line set to 'a=send/receive'. The 'normal send and receive' command may be a command as used in order to setup a media stream connection.

It has also to be noted that embodiments of the invention have been described with reference to different subject-matters. In particular, some embodiments have been described with reference to apparatus type claims whereas other embodiments have been described with reference to method type claims. However, a person skilled in the art will gather from the above and the following description that, unless other notified, in addition to any combination features belonging to one type of subject-matter also any combination between features relating to different subject-matters, in particular between features of the apparatus claims and the features of the method claims is considered to be disclosed with this application.

These and other aspects of the present invention will become apparent from and elucidated with reference to the embodiments described hereinafter.

Exemplary embodiments of the present invention will be described in the following, with reference to the following drawings.

BRIEF DESCRIPTION OF THE DRAWINGS

FIG. 3 shows a NAT-server with open pinholes for a better understanding of the present invention.

FIG. 4 shows a NAT-server with closed pinholes for a better understanding of the present invention.

FIG. 8 shows a message format for a SIP/SDP Re-INVITE request sent from a client 2 to AF according to an exemplary embodiment of the present invention.

FIG. 9 shows a message format for SIP/SDP Re-INVITE request sent from AF to client 1 according to an exemplary embodiment of the present invention.

FIG. 10 shows a message format for a SIP 200_OK SIP-message sent from a client 1 to AF according to an exemplary embodiment of the present invention.

FIG. 11 shows a command format for a Gq' AAR command sent from AF to SPDF according to an exemplary embodiment of the present invention.

FIG. 12 shows a command format for a Gq' AAA command sent from SPDF to AF according to an exemplary embodiment of the present invention.

FIG. 13 shows a message format for a SIP 200_OK message sent from AF to client 2 according to an exemplary embodiment of the present invention.

FIG. 14 shows a message format of a SIP ACK message sent from client 2 to client 1 according to an exemplary embodiment of the present invention.

FIG. 15 shows a message format for a SIP/SDP Re-INVITE request sent from client 2 to AF according to an exemplary embodiment of the present invention.

FIG. 16 shows a message format for a SIP/SDP Re-INVITE request sent from AF to client 1 according to an exemplary embodiment of the present invention.

FIG. 17 shows a message format for a SIP 200_OK message sent from client 1 to AF according to an exemplary embodiment of the present invention.

FIG. 18 shows a command format for a Gq' AAR command sent from AF to SPDF according to an exemplary embodiment of the present invention.

FIG. 19 shows a command format for a Gq' AAA command sent from SPDF to AF according to an exemplary embodiment of the present invention.

FIG. 20 shows a message format for a SIP 200_OK message sent from AF to client 2 according to an exemplary embodiment of the present invention.

FIG. 21 shows a message format for a SIP ACK message sent from client 2 to client 1 according to an exemplary embodiment of the present invention

DETAILED DESCRIPTION

Figure 1:
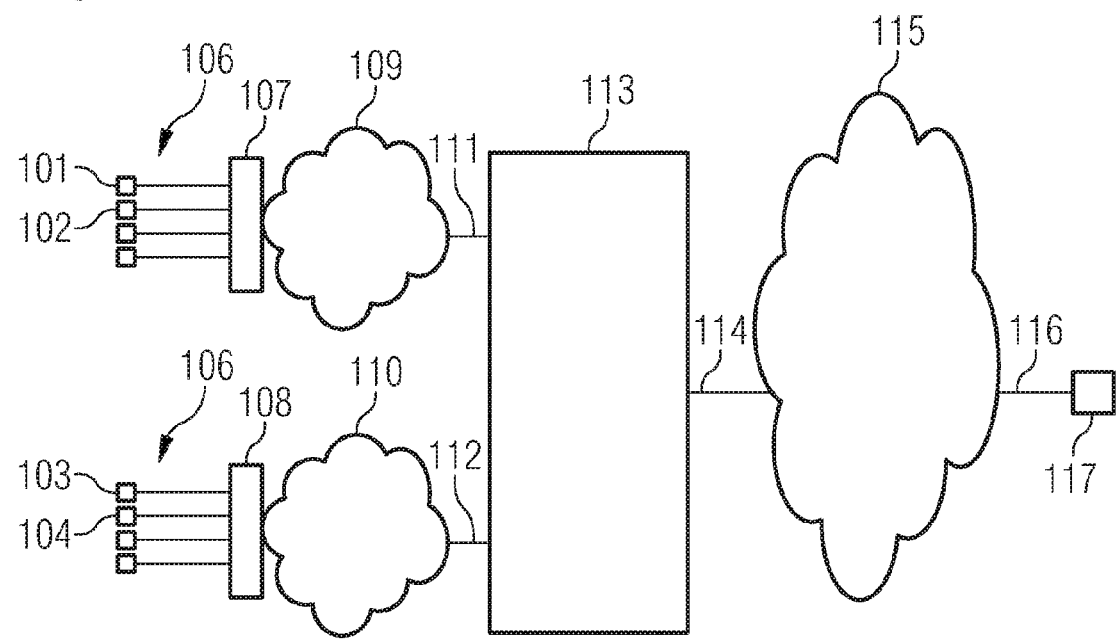
FIG. 1 shows a network diagram with a session border controller according to an exemplary embodiment of the present invention.

The illustration in the drawings is schematic. In different drawings, similar or identical elements are provided with the same reference numerals.

In the following the terms client 1, user 1, user equipment (UE) 1 or local user are equally used. Besides this, the terms client 2, user 2, user equipment (UE) 2 or remote user are equally used.

User 2 117 may be also called the remote SIP-client 117. User 1 101 may be also called the local SIP-client 101.

FIG. 1 shows a network diagram with a session border controller 113 according to an exemplary embodiment of the present invention. On the left side in FIG. 1, a plurality of user equipments 1 or users 1 101, 102, 103, 104 is shown. Using the connection lines 106 the users 1 101, 102, 103, 104 are connected to the NAT-server 107, 108.

The NAT-server 107, 108 connects the user 1 101, 102, 103, 104 or local user 101, 102, 103, 104 to the access network 109, 110. The access network 109, 110 is connected with connection line 111, 112 to the session border controller or network equipment 113.

On the right side of FIG. 1 the session border controller 113 is connected to the core network 115 via the backbone connection 114 or the backbone line 114. Traffic from a plurality of connections 111, 112 may be concentrated to the backbone line 114. Via a second backbone connection 116 a user 2, user equipment 2 or remote user 117 is connected to the core network 113 or backbone network 113.

The access network 109, 110 is based on the Internet protocol (IP) and the core network 115 as well is based on IP. The local user or local client or client 1 101, 102, 103, 104 is a user, who employs the IP protocol as well. Also the remote user or remote client or client 2 117 is a user who uses the IP protocol.

On an application layer the users 101, 102, 103, 104, 117 use the SIP/SDP protocol. The SIP/SDP protocol allows the users to communicate and to exchange media streams. In FIG. 1 two access networks 109, 110 and one core network 115 are connected to the session border controller 113. However, the possibility exists that a larger number of access networks 109, 110 or a larger number of core networks 115 are connected to the session border controller 113.

The remote user 117 in FIG. 1 is shown as being directly connected to the core network. However, this may be a symbolic illustration. Remote user 117 may also be one of the users 1, local users or clients 1 101, 102, 103, 104. Showing the remote user 117 on a different side of the session border controller 113 is to graphically distinguish between local user and remote user. The two parties, the two peers or two users 101, 102, 103, 104, 117 are connected by a media stream connection.

A connection between the different SIP-clients or user 101, 102, 103, 104, 117 may be possible. Also conferences using a selection of the users 101, 102, 103, 104, 117 may be possible.

In order to connect the session border controller 113 to the access network 109, 110 or to the core network 115 the connections 111, 112, 114 are used. The connections 111, 112, 114 are connected to the session border controller via interfaces. In particular, the interfaces of connections 111, 112, 114 are interfaces, which can be used for network equipment comprised in the access networks 109, 110 or comprised in the core network 115.

The interfaces used for connections 111, 112, 114 may be a local area network (LAN) interface or a wide area network (WAN) interface. Examples for LAN interfaces are Ethernet, Apple Talk, Token Ring. Examples for WAN interfaces are X.25, Ethernet, SDH (synchronous digital hierarchy) or SONET (synchronous optical network), WDM (wave division multiplex), ATM (asynchronous transfer mode) etc.

Figure 2:
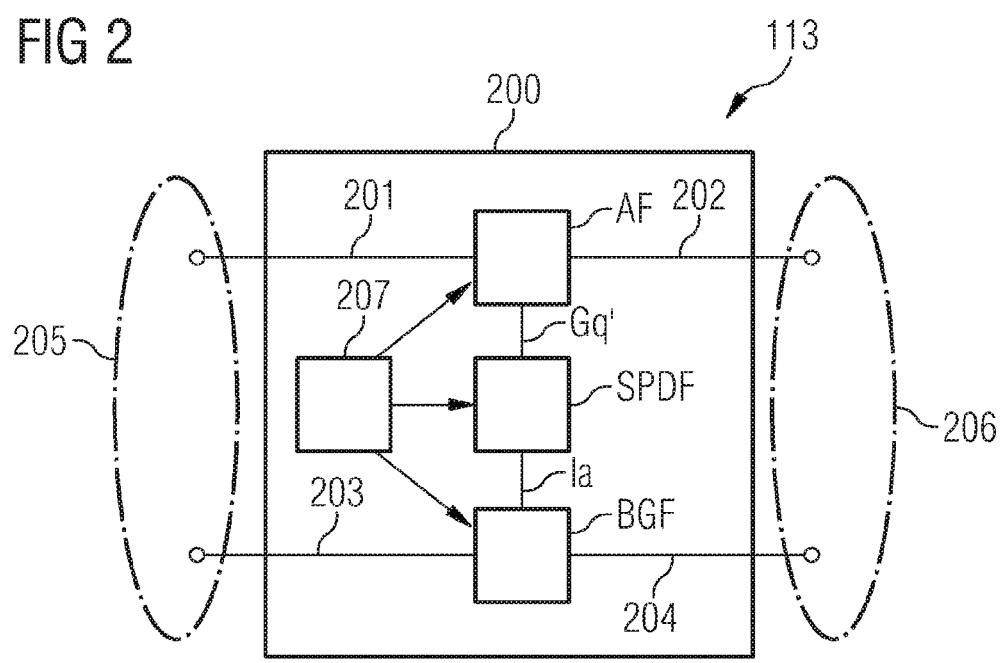
FIG. 2 shows a block diagram of a session border controller according to an exemplary embodiment of the present invention.

FIG. 2 shows a block diagram of a session border controller 113 according to an exemplary embodiment of the present invention. Furthermore, within one single housing 200 the application function AF, the service policy decision function SPDF and the border gateway function BGF are shown.

Via a Gq' interface the AF is connected to the SPDF. The SPDF and the BGF are connected via the Ia interface.

FIG. 2 also shows a first signalling interface 201 of the session border controller 113 and a second signalling interface 202 of the session border router. The signalling interfaces 201, 202 may use the SIP/SDP signalling protocol. The first signalling interface 201 connects a user 1, which is not shown in FIG. 2 to AF and the second signalling interface 202 connects user 2 to AF also not shown in FIG. 2.

The signalling interfaces 201, 202 may belong to the control plane of the session border controller 113. The signalling interfaces 201, 202 are used for exchanging signalling information between user 2 117 and user 1 101, 102, 103, 104. Control connections between the user 2 117 and the user 1 101, 102, 103, 104 use the signalling interfaces 201, 202.

The signalling messages belonging to the control connections, which signalling messages are exchanged via the signalling interfaces 201, 202 are monitored by the application function AF. Upon receipt of a signalling message initiating a new AF session, the AF shall request an authorization for the session from the SPDF by sending the AA-request (authentication authorization) message.

Furthermore, the session border controller 113 comprises two media stream interfaces 203, 204. The first media stream interface 203 is used for sending and receiving media streams from user 1 101, 102, 103 and 104. The second media stream interface 204 is used for sending and receiving media stream data from user 2 117 to the BGF. Thus, the BGF can control the media streams, which use the media stream interfaces 203, 204. Therefore, the session border controller 113 using the BGF can control the exchange of media stream data between user 1 and user 2 101, 102, 103, 104, 117.

In other words, the signalling connection, which is monitored with the AF may be used to detect certain commands or triggers from the local user 101, 102, 103, 104 or from the remote user 117. Upon receipt or upon detection of a SIP/SDP-message, which is relevant for the session border controller 113, the AF can send a corresponding control command to the BGF via the Gq' interface. This command instructs the BGF how to handle the media stream between user 1 101, 102, 103, 104 and user 2 117. Thus, for example a media stream either can be blocked or un-blocked by the BGF controlled by the AF. A SIP/SDP message, which may be relevant for the session border controller 113 may be a SIP/SDP-message indicating 'Call-on-Hold'.

The signalling connections and the media stream connections are bidirectional connections. If AF, SPDF and BGF are co-located in the same physical element, as shown in FIG. 2, in order to coordinate these functions, the session border controller 113 comprises the central controller 207. The central controller 207 is connected to the AF, the SPDF and the BGF and directs the commends between AF, SPDF and BGF. The central controller is controlled by a firmware or software, which firmware or software instructs the central controller 207 to execute the method for suspending a media stream. The central controller controls the message flow and the command flow between AF, SPDF and BGF within the session border controller 113.

If AF, SPDF and BGF are located on different physical elements, such central controller may not be used. In such a case the functions are controlled by the message flow and the command flow between AF, SPDF and BGF.

Even if the first signalling interface 201 and the first media stream interface 203 are depicted in FIG. 2 as separate connections or separate interfaces this illustration is schematic and the both connections 201, 203 may use one physical interface 205 to be connected to user 1 101, 102, 103, 103. In particular, in case that AF, SPDF and BGF are co-located in the same physical element.

Also the second signalling interface 202 and the second media stream interface 204 may be physically represented by the physical interface 206. The physical interfaces 205 and 206 may be interfaces selected from the group of interfaces consisting of Ethernet, Apple Talk, X.25, ATM, WDM (wave division multiplex), SDH and SONET.

A virtual signalling connection or controlling connection and a virtual media stream connection use a physical interface 205, 206 at the same time. The session border controller 113 may have a plurality of WAN interfaces 206 and access interfaces 205.

FIG. 3 shows a NAT-server 306 with open pinholes 310, 311 for a better understanding of the present invention. The local user 101 comprises two blocks 300, 301. The signalling block 300 describes the control functionality 300 or control plan 300 of the local user 101, in particular the control plane 300 of user equipment 1 101 is a SIP/SDP protocol control plane or a SIP/SDP protocol stack.

Furthermore, the user equipment 1 101 comprises the user block 301, the media plane 301 or user plane 301. The media plane 301 is used to produce all the digital information, which should be exchanged between two or between the plurality of users 101, 102, 103, 104, 117.

In FIG. 3 a connection between local user 101 and remote user 117 is depicted. The remote user, user equipment 2 or user 2 117 is also divided in a control plane 302 and a user plane 303 or media plane 303. User 2 exchanges via the core network 115, in particular the IP core network 115 signalling information via connection 304 with AF or the session border controller 113.

Media streams or media data, which should be exchanged between user 2 and user 1 use the media stream connection 305 between session border controller 113 and user 2 117.

The signalling connection 304 between user 2 117, 302 is terminated on the AF of the session border controller 113. The media connection between user 2 117, 303 is either terminated on BGF or routed through the BGF of the session border controller 113.

User 1 101 is connected to NAT-server 306. The NAT-server 306 is located between user 1 101 and session border controller 113. In other words, user 1 101 is located behind the NAT-server 306. The location of user 1 101 is related on a view in a downstream direction, which direction is directed from the IP core network 115 or the session border controller 113 to user 1 101.

The NAT-server 306 is also divided in a signalling plane 307 and a media plane 308 or user plane 308. The signalling connection 309 is used to exchange signalling information or signalling messages between user 1 101 and AF.

The signalling information may be a SIP/SDP information, which is exchanged between user 1 101 and session border controller 113. The signalling connection 309 between user 1 and session border controller 113 passes the signalling plane of the NAT-server 307.

The media connection 313 between the media plane 301 of user 101 and BGF of session border controller 113 passes the media plane 308 of the NAT-server 306. The media plane 308 of the NAT-server 306 provides connection points 310 and 311.

The connection points 310, 311 are called pinholes 310, 311. Between the pinholes 310, 311 a channel 312 or duct 312 is provided, which can be used for exchanging media data between the session border controller 113 and user 1 101 and for transporting traffic through the NAT-server 306.

The end-to-end control connection 309, 304 comprises the control connection 304 between the remote user 117 and AF, and the control connection 309 between AF and the local user 101.

The end-to-end media stream connection 313, 312, 314, 305 comprises the media stream connection 313 between the local user 101 and the NAT-server 306, the channel media stream 312 between pinholes 310, 311, the media stream connection 314 between NAT-server 306 and BGF, and the media stream connection 305 between BGF and remote user 117.

During a SIP/SDP session 309, 304 is active the NAT-server 306 monitors the SIP/SDP session 309,304 using the control plane 307. The NAT-server 306 uses the media plane 308 in order to monitor the media streams, which are exchanged between the SIP-clients 101, 117.

In particular the media plane 308 of the NAT-server 306 monitors the data which are exchanged between media plane 301 of user 1 101 and media plane 303 of user 2 117. When the media plane 308 of the NAT-server 306 detects that for a certain period of time the media connection 313, 312, 314 is idle, the NAT-server, in particular the media plane of the NAT-server 306 closes the pinholes 310, 311.

In other words, when the media plane 308 of the NAT-server detects that no data are exchanged between user 1 and user 2 117, the NAT-server 306 will interrupt the media connection 313, 312, 314, 305 between user 1 101 and user 2 117. However, once the connection, in particular the channel 312 is closed down or shut down by the NAT-server 306, no further exchange of media streams or of any data via the media connection 313, 312, 314, 305 between the SIP-clients 101, 117 is possible.

FIG. 4 shows a NAT-server 306 with closed pinholes 310, 311 for a better understanding of the present invention. In FIG. 4 a situation is described where the remote SIP-client 117 wants to put an established or existing connection 313, 312, 314, 305 on hold. Such a function commonly is called a call-on-hold function.

In order to initiate a call-on-hold function, the remote user 117 sends a SIP/SDP-message for indicating a call-on-hold wherein a SDP parameter is set to a=sendonly. The remote user sends the SIP/SDP message via the signalling connection 304 to the AF. Using this command the remote SIP-client 117 signals to the local SIP-client 101, which is located behind the NAT-server 306, that the local SIP-client should only receive media streams but the local user 101 should not send any media streams.

The direction of the signalling information via the signalling channel between the remote SIP-client 117 and AF and the direction of the communication between AF and the local SIP-client 101 via signalling channel 309 is depicted in FIG. 4 by an arrow 304, 306, which is directed to the AF and to the local user 101 respectively.

A call-on-hold function may be used if a short interruption of a connection between the local user 101 and the remote user 117 is required. For signalling a SDP attribute line according to IETF's Request for Comments #2327 (RFC 2327) is used. This attribute line may be identified by the small letter 'a'.

'a' may equal to 'sendonly' (a=sendonly) or it may equal to 'inactive' (a=inactive). The block diagram of FIG. 4 shows the situation after the call-on-hold state has been entered. The dash lines in FIG. 4 show that the media connection 313, 312, 314, 305 has been stopped or interrupted.

In other words, during the time the call-on-hold state is established neither the local user 101 nor the remote user 117 send any media streams. The NAT-server 306 detects that no media streams are sent via the media connection 313, 312, 314, 305, and therefore after a predetermined time period the channel 312 is closed by the NAT-server 306. The channel 312 is part of the media connection 313, 312, 314, 305, which the NAT-server 306 blocks, by closing the pinholes 310 and 311.

Figure 5:
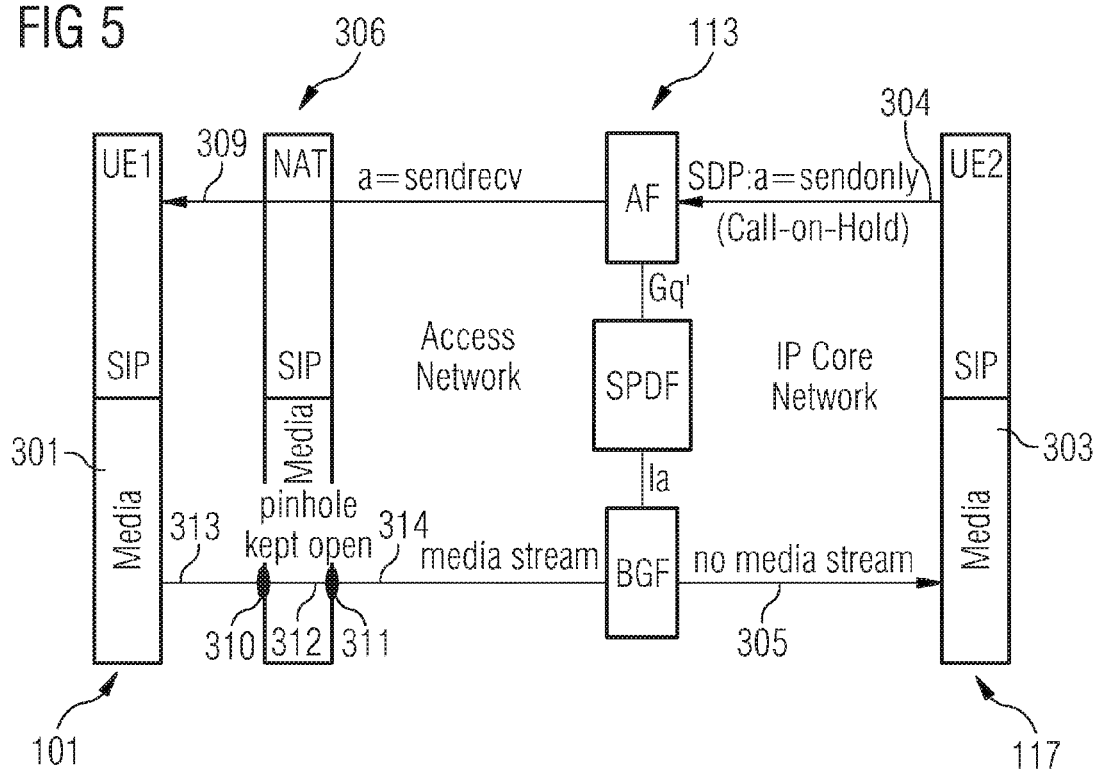
FIG. 5 shows a NAT-server with open pinholes and with an unblocked media stream for a better understanding of the present invention.

FIG. 5 shows a NAT-server 306 with open pinholes 310, 311 and an unblocked media stream for a better understanding of the present invention. In contrary to FIG. 4 the media connection 313, 312, 314 and 305 is not blocked, although the remote user 117 initiated a call-on-hold function by sending a=sendonly.

The blocking between the NAT-Server and the local user or the closing of the pinholes of the NAT-server is prevented, since the AF converts a=sendonly into a=sendrecv and thus, prevents the local user to stop the media stream. Therefore, the NAT-server 306 is prevented from blocking the media stream through the pinholes 310, 311.

Sending the SIP/SDP-message with attribute a=sendrecv via signalling channel 309 differentiates FIG. 5 from FIG. 4. In FIG. 4 the AF sends out the SIP/SDP-message with attribute a=sendonly to the local user 1 101, when the AF has received the SIP/SDP-message with a=sendonly.

In FIG. 5, the AF converts 'call-on-hold' command in a SIP/SDP-message using an 'a' attribute 'sendrecv', when the AF receives the SIP/SDP command with a=sendonly via the signalling connection 304 between AF and the remote user 117. Thus, SIP/SDP-message with a=sendrecv is sent to the local user 101. Therefore, the local user 101 does not stop sending media streams on the media plane 301 and therefore the media stream connection 313, 312, 314, 305 is still active and the pinholes 310, 311 from the NAT-server 306 are not blocked.

In other words, the session border controller 113 modifies a signalling information, which the session border controller 113 has received from the remote user 117 in order to signal to the local user 101 behind the NAT-server 306 that the local user 101 shall continue receiving and sending of media data or media streams via the media plane 301.

Continuing sending of media streams from the local user 101 to the remote user 117 keeps the pinholes 310, 311 in the NAT-server open. However, the media streams also reach the media plane 303 of the remote user 117. Since the media stream passes the core network 115, an additional load is generated in the core network 115.

Figure 6:
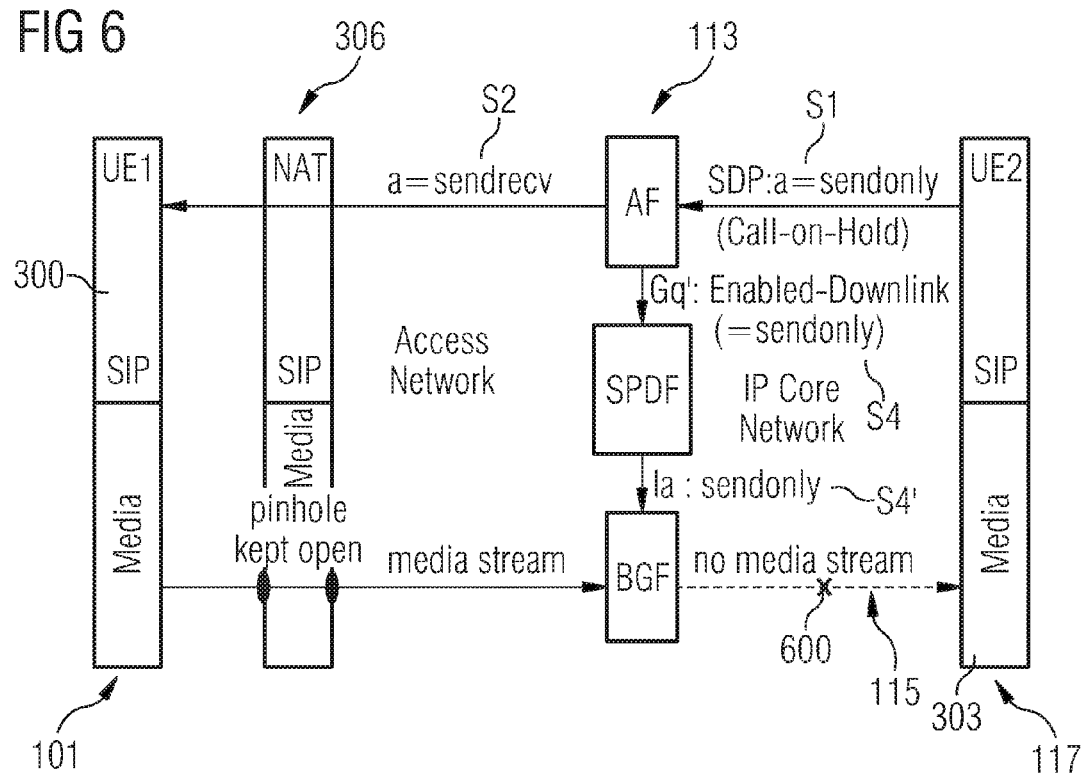
FIG. 6 shows a NAT-server with open pinholes and an unblocked media stream via the NAT-server according to an exemplary embodiment of the present invention.

FIG. 6 shows a NAT-server 306 with open pinholes and an unblocked media stream through the NAT-server according to an exemplary embodiment of the present invention. The structure of the block diagram in FIG. 6 corresponds to FIG. 5. However, a functionality is introduced, which allows to block the media stream within the session border controller 113.

Figure 7:
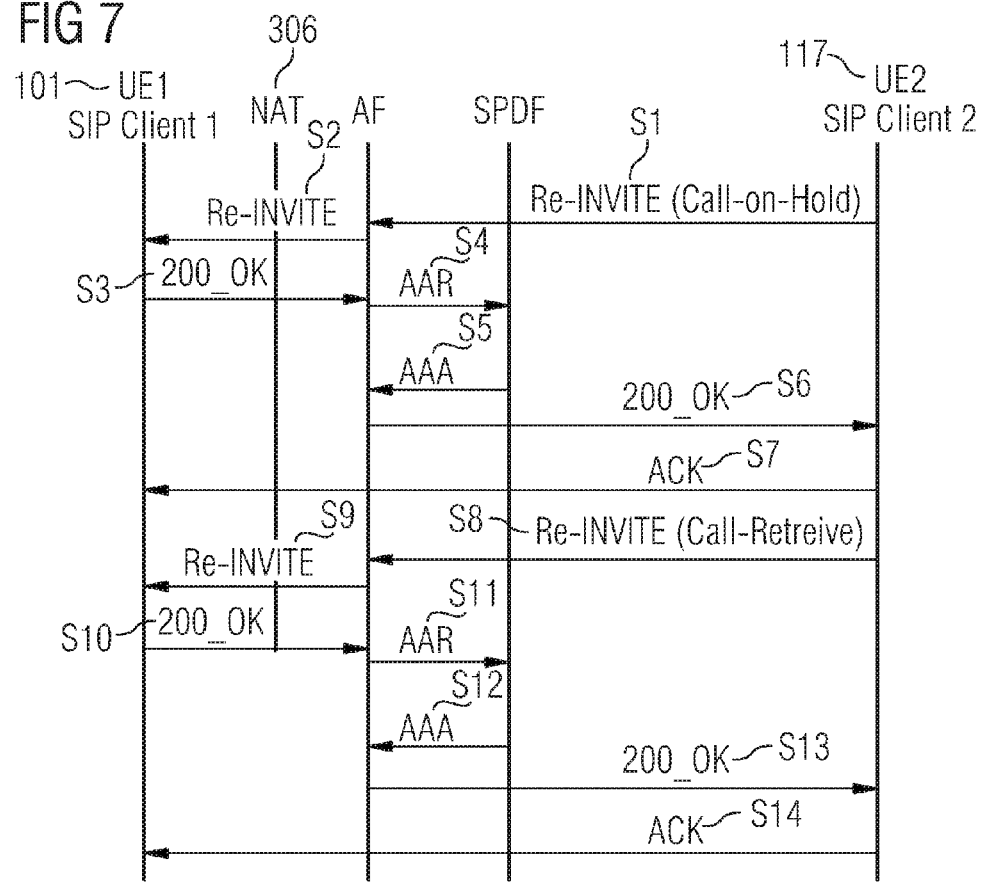
FIG. 7 shows a flow diagram for initiating and releasing a call-on-hold state according to an exemplary embodiment of the present invention.

FIG. 7 shows a flow diagram for initiating and releasing a call-on-hold function according to an exemplary embodiment of the present invention. This flow diagram shows timely dependent the exchange of messages between the remote user 117, the AF, the SPDF, the BGF, the NAT-server 306 and the local user 101. FIG. 7 also shows an address translation. The AF translates SDP addresses which translation may be necessary because the BGF is located within the media path or media stream connection 313, 312, 314, 305.

In the following FIG. 6 is described with respect of FIG. 7 and FIGS. 8 to 19, which show the corresponding messages or commands sent in the different steps of the flow diagram. In particular the relevant parameters of messages are shown in FIGS. 8 to 19.

In the case that AF, SPDF and BGF are co-located in the same physical element, a central controller within the session border controller 113 may control the message flow within the session border controller 113. Such a central controller sequences the commands. In FIGS. 8 to 19 the corresponding message formats are shown with relation to each of the steps shown in the flow-chart of FIG. 7. The steps of the flow-chart are marked with (S1)-(S19) in the FIGS. 8 to 19.

Therefore, in the following only the parameters or attributes as relevant for the present text are described. As exemplarily shown in FIG. 8 the headline of each of the messages or commands describe in brackets the number of the step corresponding to FIG. 7. The next part in the headline of a command or a message describes the direction of the message flow for example 'client 2→AF (→client 1)' means that from the originating client 2 117 a message or command is sent to client 1 or user 1 101. However, since client 2 117 directs the signalling information via the session border controller 113 the AF on the session border controller 113 terminates and interprets the command or message. In other words, a signalling information directed from client 2 to client 1 via AF is terminated in AF. Thus, the connection from client 2 to client 1 comprises a connection from client 2 to AF and a second connection from AF to client 1.

In step S1 a Re-INVITE request for indicating 'call-on-hold' is sent from client 2 to client 1 via the AF function. As can be seen in FIG. 8 and FIG. 6 the 'a' attribute of the SIP/SDP Re-INVITE request is put to 'sendonly' in order to initiate the call-on-hold functionality on user equipment 1 101.

The Re-INVITE request is received by the AF and in step S2 the AF converts the Re-INVITE request with parameter a=sendonly to a Re-INVITE request which is sent from the AF to client 1 with the 'a' attribute set to 'sendrecv'. The 'send-recv' attribute instructs the local user to continue sending and receiving of media streams.

The Re-INVITE request sent in step S1 triggers within AF the sending of the Re-INVITE request with attribute a=sendrecv directed to user 1 101.

If a central controller 207 is present, the central controller controls the AF. The central controller 207 may use a firmware or software in order to execute the method for suspending a media stream in a communication network.

Instead of preventing the local client 101 from sending a media stream, the Re-INVITE request sent in step S2 as shown in FIG. 9 signals the local client 101 to continue with sending of media streams. The SIP/SDP-message sent to the local user uses the 'a'-attribute set to a=sendrecv, which indicates a 'normal send/receive'. This message is terminated within the local user 101 within the control plane 300.

In step S3 the local user 101 responds to the AF with the SIP message 200_OK having the 'a' attribute set to 'sendrecv'. This message format is described within FIG. 10, however, the message flow of the 200_OK message is not shown in FIG. 6.

In step S4 the AF sends an Gq' authorization authentication request (AAR or AA-request) command within the session border controller 113 via the Gq' interface to the SPDF. Within this AAR command the flow status is set to 'enable-downlink'. This command is sent in the direction to the SPDF and the BGF and the command triggers the closing or blocking of the corresponding media stream. The AAR command is shown in FIG. 11.

In step S4', which step is only shown in FIG. 6, a H.248/SDP request indicating 'sendonly' is sent via the Ia interface to the BGF. Thus, the BGF blocks the media stream in order to prevent that any media stream data sent by the local user in the direction to the remote user 117 reaches the remote user 117.

In other words, the AF sends on the SIP layer a signal to the local user 101 to instruct the local user 101 to continue sending the media stream. Therefore, in the direction to the local user 101 a signal is sent in order to maintain a media stream or media stream connection. However, in the direction to the BGF the AF sends a blocking command. This blocking command triggers the blocking of the maintained media stream within the session border controller 113. However, the maintained media stream passing the NAT-server 306 is still alive and up.

In step S5 the SPDF responds to the AAR command by sending an Gq' AAA (AA-answer or authentication authorization answer) command to the AF via the Gq' interface as shown in FIG. 12. This AAA acknowledges the receipt of the AAR request command and the blocking of the media stream connection 313, 312, 314, 305. The AAA command is not shown in FIG. 6.

The receipt of the AAA command in the AF triggers in step S6 the sending of a 200_OK SIP/SDP-message from the AF to the remote client 117 with the 'a' attribute set to 'recvonly' as shown in FIG. 13. Thus, although the AF in step S2 sent an attribute information comprised in the SIP/SDP Re-INVITE request of "normal" 'send/receive' (a=sendrecv) to the local user, the AF signals in the direction to the remote user 117 a 200_OK SIP/SDP-message with an attribute 'a' set to 'recvonly'. The AF signals in the direction to the remote user 117 by using the 'recvonly' attribute that the local user 101 is set to the call-on-hold state (a=sendonly). Therefore, the remote user does not expect receiving a stream data.

However, since in step S2 the local user 101 received the SIP/SDP Re-INVITE request with an attribute 'a' set to 'sendrecv', the local user 101 continues sending the media stream and thus, the pinholes of the NAT-server 306 are kept open.

As shown in FIG. 14 in step S7 the remote client 117 sends a SIP ACK (acknowledge) message directly to the local user 101. The ACK message is not terminated on the AF. The ACK message confirms in the direction to the local user 101 that the call-on-hold state is reached.

After this call-on-hold state of the local user is reached, the remote user 117, which triggered the call-on-hold state, may respond to another call, which the remote user 117 has received.

In FIG. 6 the blocked call is shown as a dashed line 600 between BGF and the media plane 303 or user plane 303 of the remote client 117 600.

When the remote user wants to re-establish or retrieve the call in step S8 a SIP/SDP Re-INVITE request is sent from remote user 117 to AF. Within this SIP/SDP Re-INVITE request the attribute 'a' is set to 'sendrecv'. Since the media stream is in a pseudo suspended state and the remote user 117 believes that the media stream is suspended and the AF administrates the media stream as suspended, the 'sendrecv' attribute triggers a call retrieve. The message format for the Re-INVITE request is shown in FIG. 15.

After the AF has received the trigger or Re-INVITE request originated from the remote user 117 the AF sends in step S9 a SIP/SDP Re-INVITE request to the local user 101 as shown in FIG. 16. Within this Re-INVITE request sent from AF to client 1, in order to retrieve the suspended call the 'a' attribute is set to 'sendrecv', which signals the "normal" 'send/receive' state.

In step S10 the local user 101 responds to the Re-INVITE request with a 200_OK message with an 'a' attribute set to 'sendrecv' in the direction to the AF as shown in FIG. 17.

When the AF receives this 200_OK message in the blocking state, as shown in step S11, a Gq' AAR command is sent from the AF via the Gq' interface to the SPDF as shown in FIG. 18. The flow status within the AAR command is set to 'enabled'. This AAR command triggers the SPDF to stop the blocking of the media stream within the BGF and allows the media stream to reach the remote user 117 and to continue the communication via the media stream 313, 312, 314, 305.

In step S12 the SPDF responds to the AAR command with a Gq' AAA command to the AF via the Gq' interface. The AAA command of step S12 is shown in FIG. 19.

After the receipt of the AAA command the AF sends in step S13 a SIP/SDP 200_OK message with an 'a' attribute set to 'sendrecv' to the remote user 117. The SIP/SDP 200_OK message is shown in FIG. 20.

In step S14 the remote user 117 responds with a SIP ACK message to client 1 in order to signal the save receipt of the media stream connection 313, 312, 314, 305. Following step S14 a standard media stream connection 313, 312, 314, 305 between local user 101 and remote user 117 is re-established and can be used. The SIP ACK message of step S14 is shown in FIG. 21.

It may be seen as an idea of the present invention that within the session border controller 113 the AF modifies a signalling message received from the remote user 117 in order to signal to the local user 101 to keep the media streams 313, 312, 314 and 305 up and running. In addition the session border controller 113 blocks with the BGF the media stream 313, 312, 314, 305. Thus, the media stream which origins from the local user 101 and in particular from the user plane 301 from the local user 101 can be blocked in the BGF as shown in FIG. 6.

Thus, in the state of a call-on-hold function for example the NAT-server and in particular the pinholes of a NAT-server can be kept open. Media streams, which are sent from the local user to the remote user can be blocked by the session border controller 113 and thus, cannot reach into the IP network or IP core network 115 and the media streams cannot reach the remote user 117.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A method comprising:
   maintaining a media stream through a first network equipment while suspending an associated media stream connection in a communication network by
   receiving, from a first user, within a second network equipment a trigger comprising a first signalling command for temporarily suspending a media stream connection between the first user and a second user, where first signalling command comprises a SIP/SDP-command indicating 'Call-on-Hold';
   modifying the first signalling command and instead sending to the second user a second signalling command for maintaining the media stream connection, where the second signalling command comprises a SIP/SDP-command indicating normal send and receive such that the maintaining does not shut down the media stream connection;
   blocking the maintained media stream connection between the first user and the second user by the second network equipment; and
   coordinating, by a central controller of the second network equipment, based upon the receiving of the first signal by the second network equipment, both the sending of the second signalling command to the second user for maintaining the media stream and the blocking of the maintained media stream by the second network equipment, where the receiving of the first signal by the second network equipment at least partially triggers both the sending of the second signalling command to the second user for maintaining the media stream and the blocking of the maintained media stream by the second network equipment which are coordinated by the central controller of the second network equipment.

2. The method of claim 1, wherein the second network equipment comprises at least one selected of the group of network equipments consisting of a router, an access router, a session border controller, a border gateway router, a NAT-server, a firewall, a cable-modem head end and a DSLAM.

3. The method of claim 1, further comprising:
   receiving the trigger by an application function (AF).

4. The method of claim 1, further comprising:
   blocking the maintained media stream by a border gateway function (BGF).

5. The method of claim 4, further comprising:
   communicating between an application function (AF) that receives the trigger and the border gateway function (BGF) via a service policy decision function (SPDF).

6. The method of claim 1, wherein the second signalling command for maintaining the media stream comprises a SIP/SDP-command indicating sending/receiving by a SDP attribute line 'a=send/receive'.

7. A non-transitory computer-readable medium, in which a computer program for maintaining a media stream through a network equipment while suspending an associated media stream connection in a communication network is stored, which program, when being executed by a processor, is adapted to carry out the method of claim 1.

8. A program element for maintaining a media stream through a network equipment while suspending an associated media stream connection in a communication network, the program element being stored on a non-transitory computer-readable medium, said program element, when being executed by a processor, is adapted to carry out the method of claim 1.

9. The method of claim 1 further comprising subsequently unblocking the maintained media stream connection by the second network equipment without establishing a new connection.

10. A network equipment for maintaining a media stream through another network equipment while suspending an associated media stream connection in a communication network, the network equipment comprising:
    a receiving unit (AF);
    a signalling unit (AF);
    a blocking unit (BGF);
    wherein the receiving unit (AF) is adapted to receive, from a first user, a trigger comprising a first signalling command for suspending a media stream connection between the first user and a second user, wherein the trigger comprises a SIP/SDP-command indicating 'call-on-hold';
    wherein the signalling unit (AF) is adapted to modify the first signalling command and to instead send, based on the received trigger for suspending, to the second user a second signalling command for maintaining the media stream connection, where the second signalling command for maintaining the media stream comprises a SIP/SDP send/receive command indicating normal send and receive such that the maintaining does not shut down the media stream connection;
    the blocking unit (BGF) is adapted to block the maintained media stream connection between the first user and the second user; and
    where the network equipment further comprises a central controller, where the central controller is adapted to coordinate, based upon the receiving of the first signal by the second network equipment, both the sending of the second signalling command to the second user for maintaining the media stream and the blocking the maintained media stream, where the receiving of the first signal by the second network equipment at least partially triggers both the sending of the second signalling command to the second user for maintaining the media stream and the blocking of the maintained media stream by the second network equipment which the central controller of the second network equipment is configured to coordinated.

11. The network equipment of claim 10, wherein the blocking unit (BGF) is adapted to block the media stream within the network equipment.

12. The network equipment of claim 10, wherein at least one of the trigger and the second signalling command for maintaining the media stream comprises a SIP/SDP message.

13. The network equipment of claim 10, wherein the network equipment comprises at least one selected of the group of network equipments consisting of a router, an access router, a session border controller, a border gateway router, a NAT-server, a firewall, a cable-modem head end and a DSLAM.

14. The network equipment of claim 10, the receiving unit (AF) further comprising:
   an application function (AF);
   wherein the application function (AF) is adapted to receive the trigger.

15. The network equipment of claim 10, the blocking unit further comprising:
   a border gateway function (BGF);
   wherein the border gateway function (BGF) is adapted to block the maintained media stream.

16. The network equipment of claim 15, the network equipment further comprising:
   a service policy decision function (SPDF);
   wherein the service policy decision function (SPDF) is adapted to communicate with an application function (AF) and with the border gateway function (BGF);
   wherein the service policy decision function (SPDF) is adapted to control communication between the application function (AF) and the border gateway function (BGF).

17. The network equipment of claim 10, wherein the second signalling command for maintaining the media stream comprises a SIP/SDP-command indicating sending/receiving by a SDP attribute line 'a=send/receive'.

18. The network equipment of claim 10 where the second network equipment is configured to subsequently unblocking the maintained media stream connection by the second network equipment without establishing a new connection.

19. The network equipment of claim 10 where the receiving unit (AF), the signalling unit (AF), the blocking unit (BGF) and the central controller are inside a common housing.

* * * * *